United States Patent
Ferreira De Araujo

(10) Patent No.: US 12,442,465 B2
(45) Date of Patent: Oct. 14, 2025

(54) VALVE DRIVING WITH MECHANICAL DELAY

(71) Applicant: Petróleo Brasileiro S.A.—Petrobras, Rio de Janeiro (BR)

(72) Inventor: Mateus Henrique Ferreira De Araujo, Rio de Janeiro (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 385 days.

(21) Appl. No.: 18/087,415

(22) Filed: Dec. 22, 2022

(65) Prior Publication Data

US 2023/0204124 A1  Jun. 29, 2023

(30) Foreign Application Priority Data

Dec. 23, 2021  (BR) ................ 10 2021 026233 8

(51) Int. Cl.
*F16K 31/40* (2006.01)
*F15B 21/10* (2006.01)

(52) U.S. Cl.
CPC ........... *F16K 31/406* (2013.01); *F15B 21/10* (2013.01); *F15B 2211/3056* (2013.01); *F15B 2211/40584* (2013.01); *F15B 2211/5151* (2013.01); *F15B 2211/8623* (2013.01)

(58) Field of Classification Search
CPC .............. F16K 31/406; F15B 21/10; F15B 2211/3056; F15B 2211/40584; F15B 2211/5151; F15B 2211/8623
See application file for complete search history.

(56) References Cited

U.S. PATENT DOCUMENTS 3,961,862 A * 6/1976 Edstrom ............. F04B 49/10
417/295
5,682,916 A 11/1997 Hanlin

FOREIGN PATENT DOCUMENTS

GB 1096154 A 12/1967
GB 1368067 A 9/1974

* cited by examiner

*Primary Examiner* — Marina A Tietjen
(74) *Attorney, Agent, or Firm* — Morrison & Foerster LLP

(57) ABSTRACT

The present invention provides an electro-pneumatic arrangement to act as a mechanical timer (delay) in ON-OFF valve actuators. The arrangement comprises: two directional valves (1 and 2) with three ways and two positions, actuated by solenoid; a three-way, two-position directional valve (3), actuated by a pneumatic pilot; a set of compressed air conditioning with filter and pressure regulating valve (4); a valve metering (precise flow rate adjustment) (5), a check valve (6); and an accumulator vessel (7).

3 Claims, 4 Drawing Sheets

VALVE DRIVING WITH MECHANICAL DELAY

CROSS-REFERENCE TO RELATED APPLICATION

This application claims priority to Brazilian Application No. BR 10 2021 026233 8, filed on Dec. 23, 2021, and entitled "VALVE DRIVING WITH MECHANICAL DELAY," the disclosure of which is incorporated herein by reference in its entirety.

FIELD OF INVENTION

The present invention is related to the control and driving area of the BDV (Blowdown Valve) valve relief system in oil production units.

DESCRIPTION OF THE STATE OF THE ART

The type of a control valve driving defines its application in the system. These drivings can occur by muscular, mechanical, pneumatic, hydraulic or electrical force.

Single-acting ON-OFF type control valves are characterized by having their actuator energized in operation mode and, in the event of interruption of the supplied energy, they are driven to the safety state through the potential energy stored in the actuator, generally a spring. However, this shift is normally not timed (delayed) and, in case of loss of electrical power to the unit controllers, it may be necessary to adjust a controlled opening time of some ON-OFF valves, for operational or process safety reasons, object of this invention.

Document U.S. Pat. No. 5,682,916A refers to a controller for a blowdown valve in a cooling tower system, the cooling tower system having a first water source and a second water source.

Document GB1368067A discloses a control unit that controls the power supply to the solenoids. The solenoid controls the supply of steam/condensate to the blowdown valve and the solenoid controls the valve. The control unit comprises an interval timer and a duration timer.

Document GB1096154A discloses an electrically operated blowdown valve for opening and closing the boiler bottom to drain water from the boiler, wherein a relay device in the circuit actuates the blowdown valve periodically after detection, through probes, of a predetermined conductivity of the boiler water, and a proportion timer in the circuit operatively connected with respect to the blowdown valve to allow periodically opening of the valve within a certain time interval, wherein the duration of each period of valve opening and the duration of the interval between the successive openings of the valve is correlated, in order to avoid water silting up in the boiler.

Prior arts reveal systems used to control the operation of blowdown valves. However, none of these documents, represented herein as state of the art, seek to solve the technical problem of timing the blowdown valve after controllers and respective solenoids loss of electrical power.

In view of the difficulties present in the state of the art mentioned above, and for solutions of valve driving with mechanical delay, it arises the need to develop a technology capable of performing effectively and that is in accordance with environmental and safety guidelines. The state of the art above mentioned does not have the unique characteristics that will be presented in detail below.

OBJECT OF THE INVENTION

It is an object of the invention to allow the controlled timing (delay) of BDVs opening after a scenario of electrical energy loss of the controllers and respective solenoids.

BRIEF DESCRIPTION OF THE INVENTION

The present invention provides an electro-pneumatic arrangement to act as a mechanical timer in pneumatic or hydraulic actuators of single-acting ON-OFF valves, with emphasis on blowdown valves. The arrangement consists of two solenoid-actuated directional valves, a pneumatic pilot-actuated directional valve, as well as a pressure regulating valve, a mettering valve (precise flow rate adjustment), a check valve, a compressed air accumulator vessel, tubing and pneumatic and electrical connections.

BRIEF DESCRIPTION OF DRAWINGS

The present invention will be described in more detail below, referring to the attached figures which, in a schematic way and not limited of the inventive scope, represent examples of its realization. The drawings show.

DETAILED DESCRIPTION OF THE INVENTION

Below follows a detailed description of a preferred embodiment of the present invention, by way of example and in no way limiting. Nevertheless, it will be clear to a person skilled in the art, from the reading of this description, possible additional embodiments of the present invention further comprised by the essential and optional features below.

The invention refers to a device (electropneumatic panel) for activating an ON-OFF valve (BDV) with mechanical delay. Said device came up with the need to time the opening of the BDV after a scenario of electrical energy loss from the controllers, which cannot be prevented with programming logic.

Figure 1:
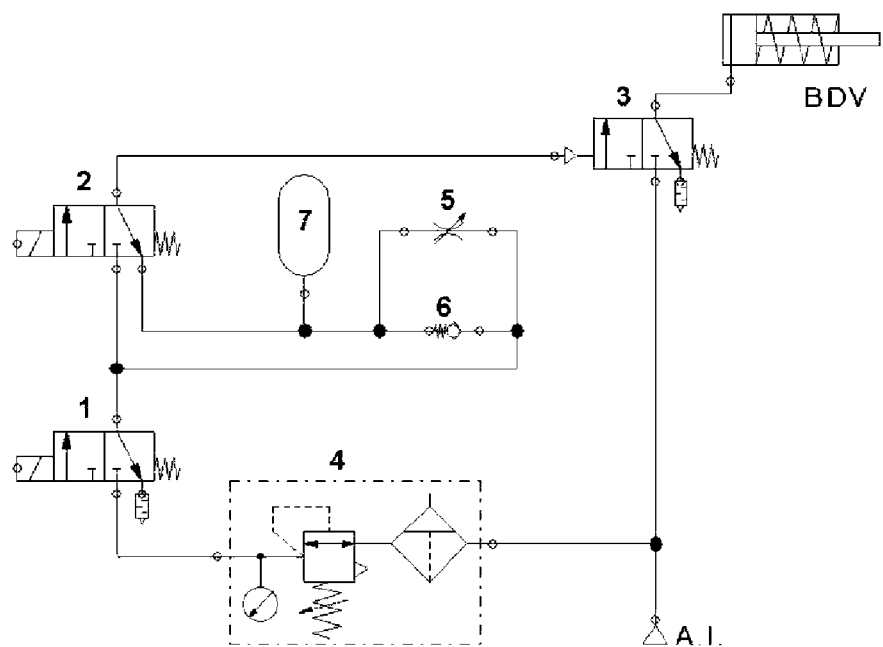
FIG. 1 illustrating the schematic diagram of the mechanical timing system by driving delay of the present invention FIG. 2 illustrating the system of the invention with pneumatic energy, ready to operate.

The arrangement of the present invention and illustrated in FIG. 1 comprises: two directional valves (1 and 2) with three ways and two positions, actuated by solenoid; a three-way, two-position directional valve (3), actuated by a pneumatic pilot; a set of compressed air conditioning with filter and pressure regulating valve (4); a valve metering (precise flow rate adjustment) (5), a check valve (6); and an accumulator vessel (7).

Figure 2:
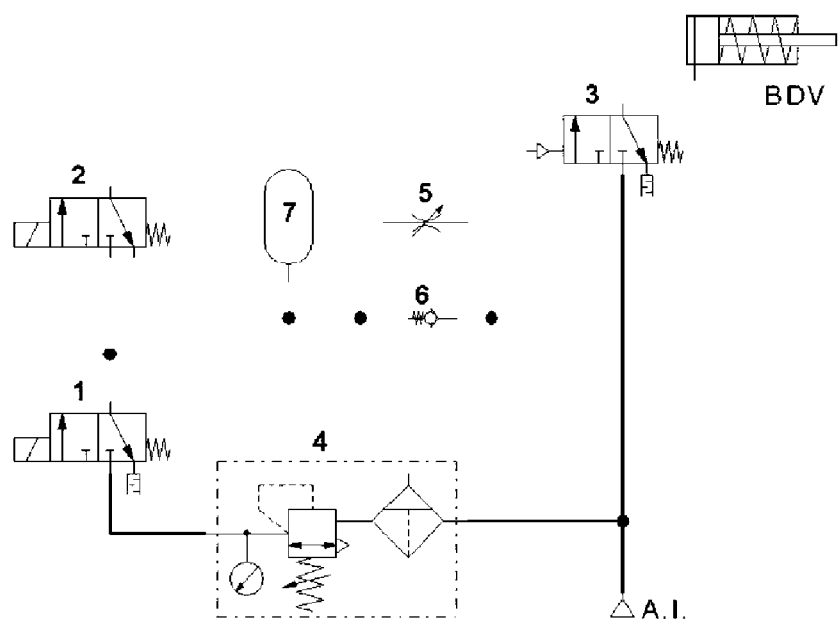

Initially, compressed air (A.I.) is aligned from the process plant to the set and the system is pressurized with the directional valves (1, 2 and 3) in the off position, as shown in FIG. 2.

Figure 3:
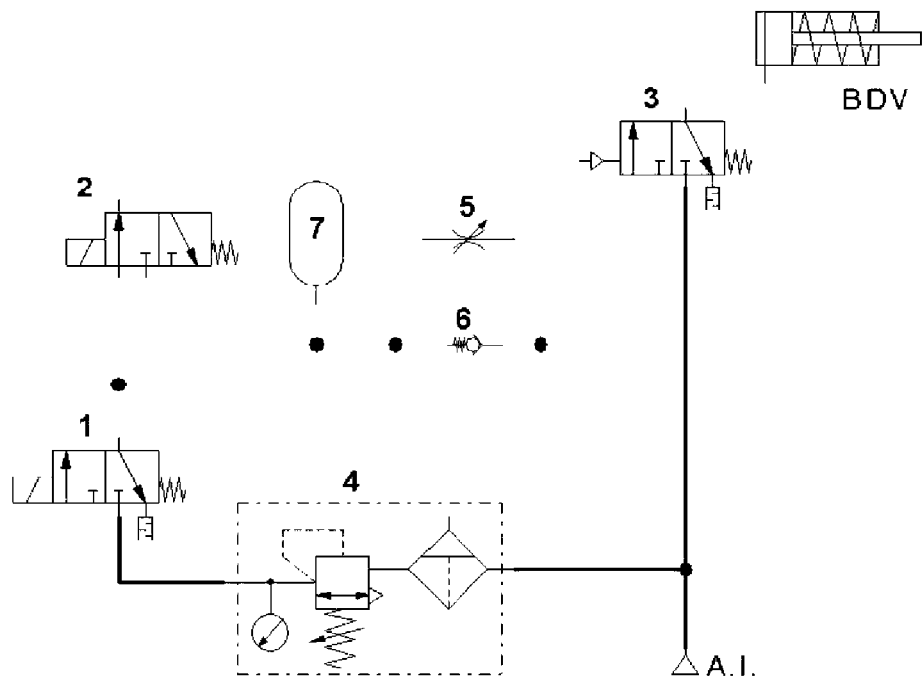
FIG. 3 illustrating the system of the invention with pneumatic and electrical energy, wherein the solenoid is energized (2), which inhibits the timing.
Figure 4:
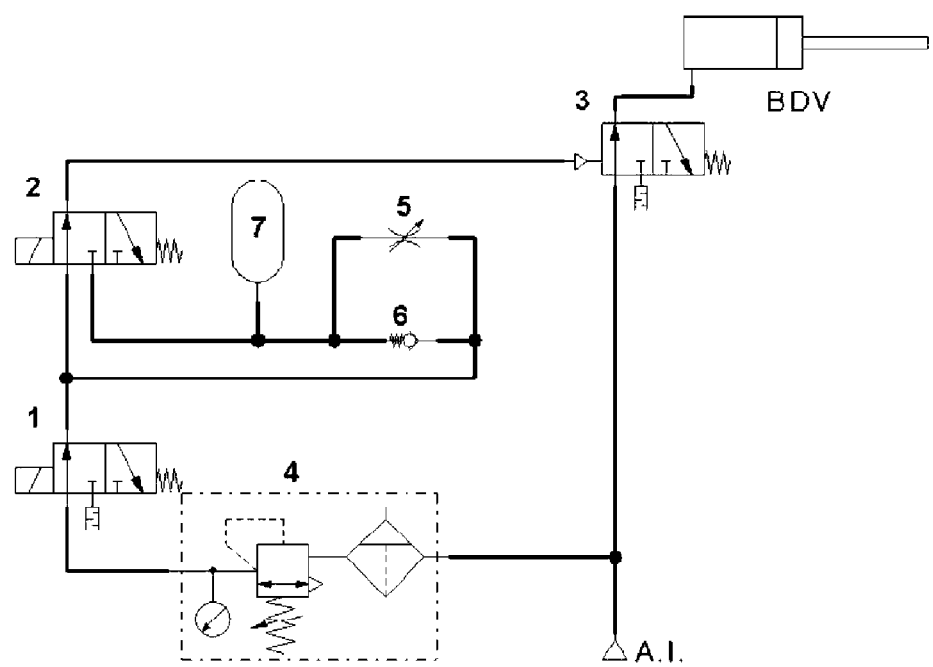
FIG. 4 illustrating the command for the activated solenoid (1) and the actuated closed BDV, in operating position.

With the system of the invention ready for operation, the solenoid that actuates the directional valve (2) is energized, inhibiting the timing path. This is the normal operating condition, which enables the driving of the BDV, by the control system, without timing, that is, under normal operating conditions. This configuration is illustrated in FIG. 3. The BDV can be actuated by energizing the directional valve solenoid (1), as shown in FIG. 4.

Figure 5:
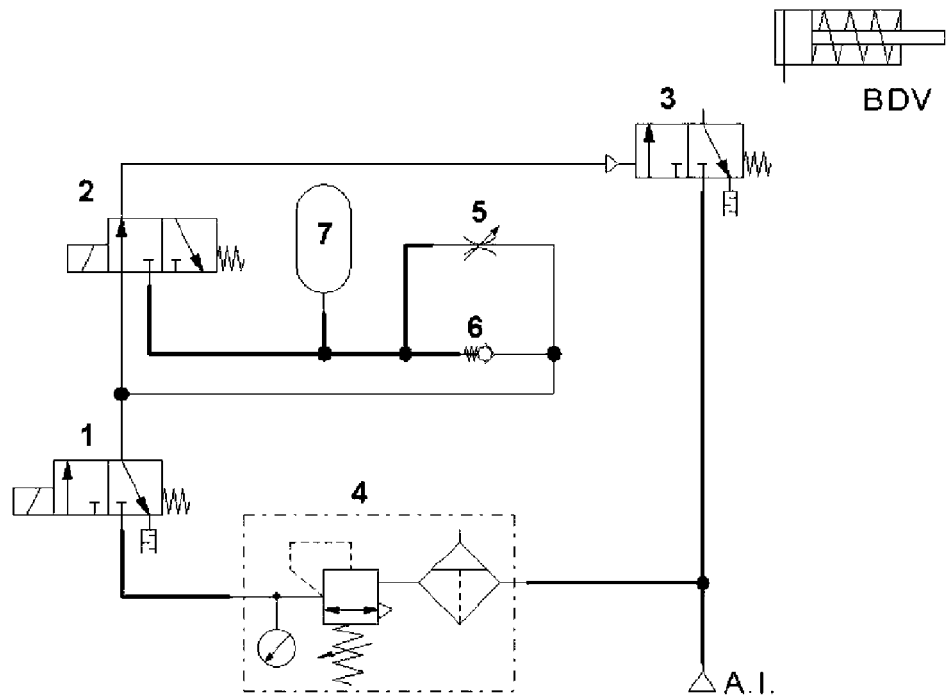
FIG. 5 illustrating normal operation, with commanded BDV opening, without timing.

Removing the energy from the solenoid of (1), the BDV will return to the safety situation, by the action of the spring of its actuator. The BDV driving occurs normally, without timing (delay) by the circuit, as shown in FIG. 5.

Figure 6:
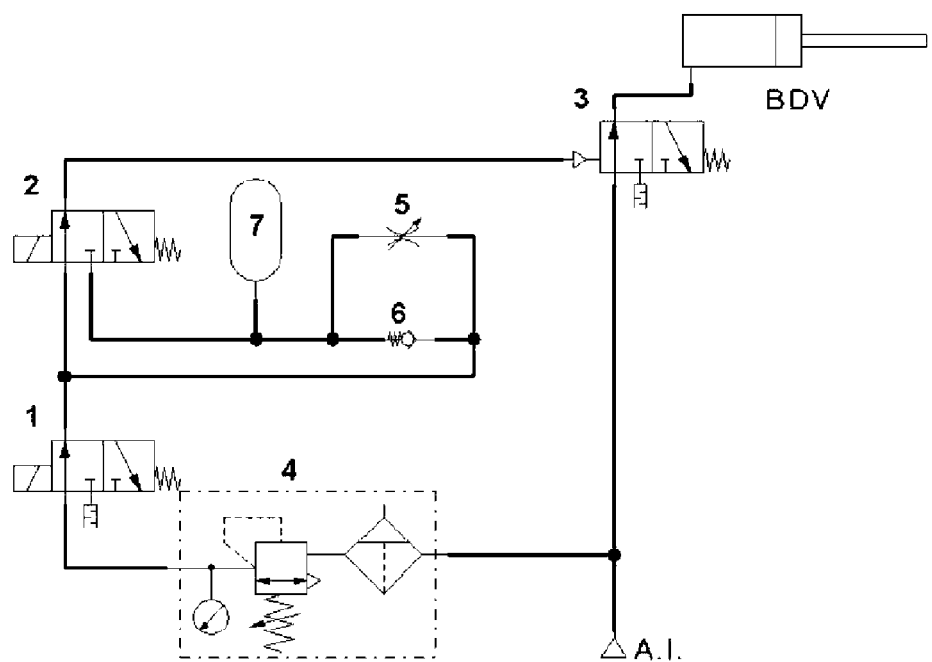
FIG. 6 illustrating normal operation, with commanded BDV closure.

The BDV valve can be operated normally, without delaying its driving. FIG. 6 again shows the command and configuration for actuation (closing) of the BDV.

However, if the BDV is actuated (normal operating mode) and a loss of electrical power occurs in the control system, both directional valve solenoids (1 and 2) will lose power and go to the safe position through the spring force moving its spool. At this moment, the directional valve (2) activates the timing path in the circuit, initiating the controlled depressurization of the accumulator vessel (7) through the mettering valve (5). When the circuit pressure drops enough to disable the piloted directional valve (3), the BDV will open.

The design of the delay time adjustment contemplates the variables: regulated pressure in (4), accumulator volume in (7) and flow rate adjusted by the mettering valve (5). The times are defined for each valve, allowing a staggered opening (depressurization) in the process unit. The BDV opening takes place quickly, so as not to allow freezing, if it presents potential. The delay system does not interfere with the normal operation of the BDV, either by the safety controller or manually by the control operator.

Figure 7:
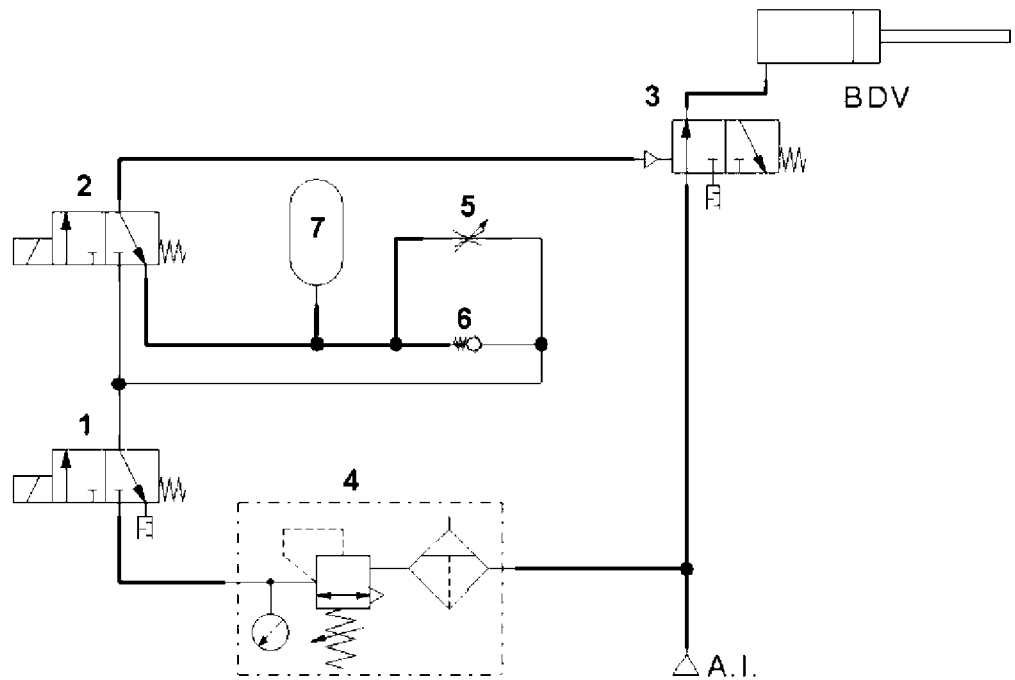
FIG. 7 illustrating the situation with the loss of power supply, in which the BDV remains closed and the circuit starts to be timed.
Figure 8:
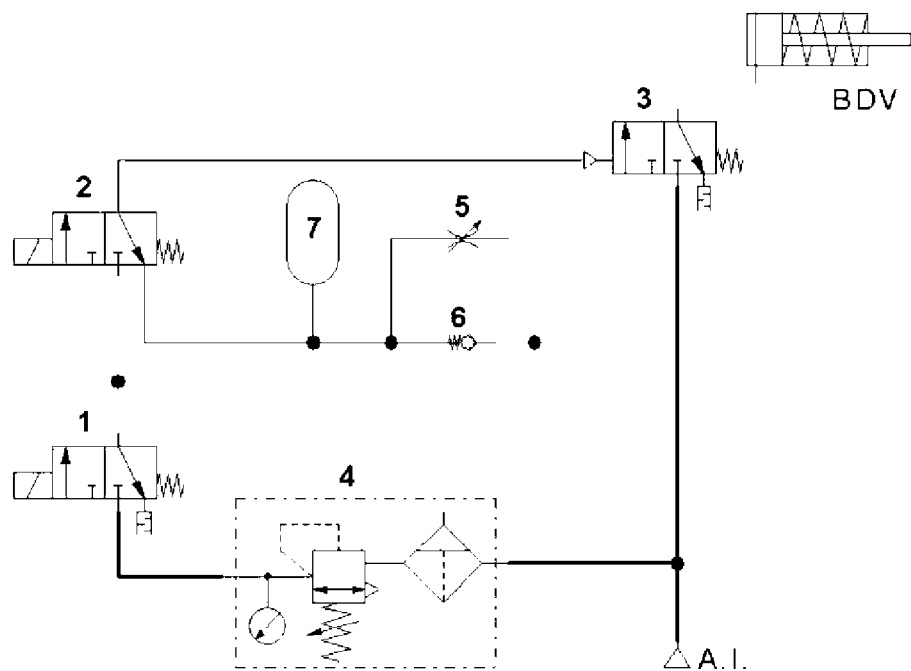
FIG. 8 illustrating the open BDV after the adjusted delay.

FIG. 7 represents the actuated BDV and timing its opening, once the solenoids are de-energized. FIG. 8 shows the BDV opened after the configured delay.

The invention claimed is:

1. A valve driver with a mechanical delay, the valve driver comprising;
   two directional valves, each of the two directional valves having three ways and two positions, each of the two directional valves actuated by an electrical solenoid;
   a three-way, two-position directional valve actuated by a pneumatic pilot fluidically coupled and actuable by the two directional valves;
   a set of compressed air conditioning with filter and pressure regulating valve;
   an accumulator vessel;
   flowrate adjustment valve arranged and configured to regulate a flowrate from the accumulator vessel;
   a check valve arranged and configured to allow flow into the accumulator vessel.

2. The valve driver according to claim 1, wherein a valve being driven by the valve driver is a blowdown valve (BDV), wherein the pressure regulating valve, a volume of the accumulator vessel, and the flowrate adjustment valve are configured to adjust an opening time of the BDV.

3. The valve driver according to claim 2, wherein the opening time is sufficient enough to allow a staggered depressurization of a process unit, delaying an opening of the BDV, during electric power loss of controllers coupled to the valve driver.

* * * * *